(12) United States Patent
Huang et al.

(10) Patent No.: US 6,878,331 B2
(45) Date of Patent: Apr. 12, 2005

(54) MANUFACTURE OF CARBON COMPOSITES BY HOT PRESSING

(75) Inventors: Dai Huang, Sagamore Hills, OH (US); Richard T. Lewis, Auburn, OH (US); Irwin C. Lewis, Strongsville, OH (US); David Snyder, Cuyahoga Falls, OH (US)

(73) Assignee: UCAR Carbon Company Inc., Wilmington, DE (US)

( * ) Notice: Subject to any disclaimer, the term of this patent is extended or adjusted under 35 U.S.C. 154(b) by 0 days.

(21) Appl. No.: 10/372,349

(22) Filed: Feb. 24, 2003

(65) Prior Publication Data

US 2004/0105969 A1 Jun. 3, 2004

Related U.S. Application Data

(60) Provisional application No. 60/430,578, filed on Dec. 3, 2002.

(51) Int. Cl.[7] .............................................. B29C 35/00
(52) U.S. Cl. ..................... 264/434; 264/29.2; 264/29.5; 264/29.7; 264/102; 264/258; 264/450; 264/451; 264/511; 264/512
(58) Field of Search .............................. 264/29.1–29.7, 264/434, 571, 258, 101, 102, 510, 511, 512, 450, 451

(56) References Cited

U.S. PATENT DOCUMENTS

| | | | |
|---|---|---|---|
| 4,166,145 A | 8/1979 | Hatch et al. ................. 428/283 |
| 4,457,967 A | 7/1984 | Chareire et al. | |
| 4,544,412 A | 10/1985 | Vetri et al. | |
| 4,617,165 A | 10/1986 | Tsang et al. ................. 264/236 |
| 4,722,817 A | 2/1988 | Nakano | |
| 4,775,705 A | 10/1988 | Parker et al. ............... 523/153 |
| 4,874,564 A | * 10/1989 | Sudani et al. .............. 264/24.7 |
| 4,902,453 A | * 2/1990 | Okura et al. ............... 264/29.2 |
| 5,007,508 A | 4/1991 | Lacombe | |
| 5,009,823 A | 4/1991 | Kromrey | |
| 5,202,293 A | 4/1993 | Okamoto et al. | |
| 5,246,638 A | 9/1993 | Goldberger | |
| 5,256,448 A | 10/1993 | De Castro | |
| 5,298,311 A | 3/1994 | Bentson et al. | |
| 5,306,678 A | 4/1994 | Yoshida et al. | |
| 5,376,595 A | 12/1994 | Zupancic et al. | |
| 5,377,792 A | 1/1995 | Idesawa | |
| 5,439,080 A | 8/1995 | Haneda et al. | |
| 5,525,558 A | 6/1996 | Nieve et al. | |
| 5,556,704 A | 9/1996 | Prevorsek et al. | |

(Continued)

FOREIGN PATENT DOCUMENTS

JP        62-185845       *   8/1987

OTHER PUBLICATIONS

SGL Carbon Company, Sigrasic Brochure, SGL Technik GmbH, (May 1999) Meitingen, Germany.

*Primary Examiner*—Stefan Staicovici
(74) *Attorney, Agent, or Firm*—Waddey & Patterson, P.C.; James R. Cartiolia (57) ABSTRACT

A mixture of carbon-containing fibers, such as mesophase or isotropic pitch fibers, a suitable matrix material, such as a milled pitch is compressed while resistively heating the mixture to form a carbonized composite material. Preferably, the carbonized material has a density of at least about 1.30 g/cm³. Preferably, the composite material is formed in less than ten minutes. This is a significantly shorter time than for conventional processes, which typically take several days and achieve a lower density material. A treating component may be impregnated into the composite. Consequently, carbon composite materials having final densities of about 1.6–1.8 g/cm³ or higher are readily achieved with one or two infiltration cycles using a pitch or other carbonaceous material to fill voids in the composite and rebaking.

10 Claims, 3 Drawing Sheets

U.S. PATENT DOCUMENTS

| | | | |
|---|---|---|---|
| 5,609,707 A | | 3/1997 | Bazshushtari et al. |
| 5,686,117 A | * | 11/1997 | Snyder et al. .............. 425/112 |
| 5,744,075 A | | 4/1998 | Klett et al. |
| 5,804,116 A | | 9/1998 | Schmid et al. |
| 5,807,518 A | | 9/1998 | Menard et al. ............. 264/258 |
| 5,820,788 A | | 10/1998 | Smith |
| 5,876,850 A | | 3/1999 | Skowronski et al. |
| 5,882,570 A | | 3/1999 | Hayward |
| 5,962,135 A | * | 10/1999 | Walker et al. .............. 428/408 |
| 5,979,615 A | | 11/1999 | Thompson et al. |
| 5,989,504 A | | 11/1999 | Wilson et al. |
| 5,993,905 A | | 11/1999 | Sheehan |
| 6,030,913 A | | 2/2000 | Heine et al. |
| 6,051,167 A | | 4/2000 | Withers et al. |
| 6,062,351 A | | 5/2000 | Strasser et al. ............. 188/251 |
| 6,077,607 A | | 6/2000 | Zornik ...................... 428/408 |
| 6,093,482 A | | 7/2000 | Park et al. |
| 6,129,868 A | * | 10/2000 | Penkov et al. ............. 264/29.7 |
| 6,132,877 A | | 10/2000 | Winckler et al. |
| 6,148,785 A | | 11/2000 | Rivers et al. |
| 6,183,583 B1 | | 2/2001 | Duval et al. |
| 6,231,791 B1 | | 5/2001 | Heine et al. ............... 264/29.5 |
| 6,325,608 B1 | * | 12/2001 | Shivakumar et al. .... 425/129.1 |
| 6,699,427 B2 | * | 3/2004 | Huang et al. ............... 264/434 |

* cited by examiner

MANUFACTURE OF CARBON COMPOSITES BY HOT PRESSING

This application claims the benefit of U.S. Provisional Application 60/430,578 filed Dec. 3, 2002, which is hereby incorporated herein in its entirety by reference.

BACKGROUND OF THE INVENTION

1. Field of the Invention

The present application relates to a method for forming carbon composites having a treating component suited for use as friction-bearing and structural materials for high temperature applications. In one embodiment, the composite finds particular application in conjunction with a composite material formed by resistance heating of carbon fiber/binder mixtures during application of a compressive force and will be described with particular reference thereto. It should be appreciated that the method has application in other areas where the combined effects of pressure and temperature are desired.

2. Discussion of the Art

Carbon composites, such as carbon/carbon composites, include those structures formed from a fiber reinforcement, which itself consists primarily of carbon, and a carbon matrix derived from a thermosettable resin, such as a phenolic resin or a thermoplastic binder, such as pitch. Such materials are useful in applications where high temperature frictional properties and high strength to weight ratio are important. For example, carbon/carbon composites are known to be effective for providing thermal barriers and for friction bearing applications. Carbon/carbon composites for such applications tend to exhibit good temperature stability (often up to about 3000° C., or higher), high temperature friction properties (typical coefficients of friction are in the range of 0.4–0.5 above 500–600° C.), high resistance to thermal shock, due in part to their low thermal expansion behavior, and lightness of weight. Thermal insulation materials formed from certain types of carbon fibers exhibit excellent resistance to heat flow, even at high temperatures.

Common methods of forming carbon/carbon composites begins with lay-up of a woven fiber fabric or pressing a mixture of carbonized fibers derived from pitch (e.g., mesophase pitch or isotropic pitch), cotton, polyacrylonitrile, or rayon fibers, and a fusible binder, such as a phenolic resin or furan resin (the resin process) or needling to hold the fibers together in a preform ('dry' perform process). In the resin process, the fibers are first impregnated with resin to form what is commonly known as a prepreg. Multiple layers of the prepreg or random fiber prepreg are assembled in a mold of a heated press. The prepreg is compressed while simultaneously applying heat to the mold at temperatures of 160° C.–180° C. for a period of one hour or more to cure the resin fully. The fiber and cured resin composite is then heated at a slow rate to a final temperature of about 800° C. in a separate operation to convert the binder to carbon. This carbonization step is carried out in an inert atmosphere and often takes several days to complete. Typically, the density of the carbon composite thus formed ranges from about 0.6 to 1.3 g/cm³.

For applications such as brake components and other friction-bearing applications, a density of about 1.7 g/cm³ or higher is generally desired. To reduce voids and increase its density, the carbon composite is infiltrated with a phenolic resin or other carbonizable matrix material using a vacuum followed by pressure and the infiltrated material is then carbonized by heating. Densification is also often accomplished by chemical vapor infiltration (CVI) or chemical vapor deposition (CVD). The chemical infiltration process is generally repeated three to five times before the desired density is achieved. A processing step may include graphitization of the preform by heating it in an inert atmosphere to a final temperature not exceeding about 3200° C. Above this temperature, carbon from the composite material tends to vaporize. The graphitization may be a final processing step or an intermediate step.

The lengthy heating and infiltration times render such composites expensive and impractical for many applications. For example, it may take about five months to form a carbon/carbon composite article, depending on the number of densification steps. Accordingly, sintered metal articles are commonly used for thermal applications, despite their greater weight and often poorer thermal stability and friction properties.

The present invention provides a new and improved method of forming a dense carbon composite, which overcomes the above-referenced problems and others.

SUMMARY OF THE INVENTION

In accordance with one aspect of the present invention, a method of forming a composite material is provided. The method includes combining carbon-containing fibers, a carbonizable matrix material, and a friction additive to form a mixture and heating the mixture to a sufficient temperature to melt at least a portion of the matrix material. The heating step includes applying an electric current to the mixture such that heat is generated within the mixture. While heating the mixture, a pressure of at least 35 Kg/cm² is applied to the mixture to form a compressed composite material.

Aspects of the invention include a second embodiment of adding a friction additive to the carbon/carbon ("C/C") composite. This aspect of the invention includes combining carbon-containing fibers and a carbonizable matrix material to form a mixture and heating the mixture to a sufficient temperature to melt at least a portion of the matrix material. The heating step includes applying an electric current to the mixture such that heat is generated within the mixture. While heating the mixture, a pressure of at least 35 Kg/cm² is applied to the mixture to form a compressed composite material. The additive is incorporated into the compressed composite material by impregnation.

In accordance with another aspect of the present invention, an apparatus for forming a compressed composite material is provided. The apparatus includes a vessel, which defines a cavity for receiving a material to be treated. A means for applying pressure applies a pressure of at least 35 kg/cm² to the material in the cavity (e.g., a dual action ram or a single action ram). A source of electrical power generates a current, which resistively heats the material. A temperature detector detects the temperature of the material. A control system controls the pressure applying means and the source of electrical current such that the mixture is sequentially heated at a first temperature and pressed at a first pressure for a first period of time, and heated at a second temperature higher than the first temperature and pressed at a second pressure higher than the first pressure for a second period of time.

In accordance with another aspect of the present invention, a method of forming a composite material suitable for vehicle brakes is provided. The method includes compressing a mixture of carbon fibers, a matrix material that includes pitch, and an optional friction additive. During the step of compressing, a current is applied to the mixture.

The mixture provides sufficient electrical resistance to the current such that the mixture reaches a temperature of at least 500° C. to form a compressed substrate. A carbonizable material is impregnated into voids in the compressed substrate to form an impregnated preform. The product may be heated to carbonize the carbonizable material. The impregnation and baking steps are optionally repeated. The impregnated preform may be heat treated to a temperature of at least about 2000° C. to form the composite material. Preferably, the composite material has a density of at least 1.7 g/cc within two impregnation and rebake cycles.

In accordance with another aspect of the present invention, a method of forming a composite material suitable for vehicle brakes is provided. The method includes compressing a mixture of carbon fibers and a matrix material, which includes pitch. During the step of compressing, a current is applied to the mixture. The mixture provides sufficient electrical resistance to the current such that the mixture reaches a temperature of at least 500° C. to form a compressed preform. A friction additive is impregnated into the compressed preform. A carbonizable material may also be impregnated into voids in the compressed preform. The product may be heated to carbonize the carbonizable material. The carbonizable material impregnation and baking steps are optionally repeated. The impregnated preform is heat treated to a final temperature of at least about 2000° C. to form the composite material. Preferably, the composite material has a density of at least 1.7 g/cc within two impregnation and rebake cycles.

A further aspect of the invention includes a method of forming a composite material. The method includes combining a first material, in one embodiment preferably a carbon fibers containing material, a carbonizable matrix material, and an optional friction additive to form a mixture and heating the mixture to a sufficient temperature to melt at least a portion of the matrix material. The heating step includes applying an electric current to the mixture such that heat is generated within the mixture. While heating the mixture, a pressure of at least 35 Kg/cm$^2$ is applied to the mixture to form a compressed composite material. The compressed composite material may be impregnated with a treating component.

Another aspect of the invention is a method of increasing the density of a composite. The method includes the step of combining a reinforcement material which may include carbon-containing fibers with a carbonizable matrix material to form a mixture and heating the mixture to a sufficient temperature to melt at least a portion of the matrix material. The step of heating includes applying an electric current to the mixture to generate heat within the mixture and while heating the mixture, applying a pressure of at least 35 kg/cm$^2$ to the mixture to form a compressed composite material. The density of the compressed composite is increased by introducing a carbonizable material or pyrolytic carbon into voids in the compressed composite and then, if necessary, baking the compressed composite to achieve a density of at least about 1.30 g/cm$^3$. The method further includes impregnating the compressed composite, having a density of at least about 1.30 g/cm$^3$ with a treating component.

Additional aspects of the invention include a vehicle friction brake assembly. Preferably, the assembly comprises a friction element having at least a metal surface. Preferably, the friction element rotates with a wheel of the vehicle. It is also preferred that the assembly includes a braking element having a surface aligned to movably engage the metal surface of the friction element, wherein at least the surface of the braking element comprises a carbon composite having a carbonized matrix impregnated with a treating component.

Aspects of the invention also include a method of making a vehicle friction brake assembly. The method includes a step of rotatably attaching a friction element comprising a metal surface onto a vehicle and aligning a braking element to movably engage the friction element. Preferably, the braking element comprises a surface comprised of a carbon composite having a carbonized matrix and a treating component, and the surface of the braking element is aligned to engage the metal surface.

An advantage of at least one embodiment of the present invention is that carbon-carbon composites, such as insulation materials or brake component materials, are formed in much shorter periods of time than by conventional hot pressing methods.

Another advantage of at least one embodiment of the present invention is that the density of the hot pressed material is higher than in conventional preforms, thereby enabling desired densities to be achieved with fewer densification and carbonization cycles.

Another advantage of at least one embodiment of the present invention is that a composite material is formed using fewer processing steps.

An additional advantage of the invention is that the carbon/carbon composite which includes the friction additive has a higher coefficient of friction than the carbon/carbon composite without the additive. A further advantage is that the invention may be used to incorporate the additive substantially uniformly throughout the carbon/carbon composite.

A further advantage of the inventive carbon/carbon composite which includes the friction additive is that inventive composite has improved oxidation stability as compared to a carbon/carbon composite without such friction additive.

Furthermore, the inventive carbon/carbon composite impregnated with the treat component has exhibited the advantage of improved machinability as compared to composites formed by other methods. Also, the composite has exhibited improved fade/friction properties as well as improved erosion resistance.

Another advantage of the invention is that a carbon composite having a carbonized matrix comprising the treat component may be used as a brake pad on a metal surface of a braking element, such as a rotor or brake drum.

Still further advantages of the present invention will be readily apparent to those skilled in the art, upon a reading of the following disclosure and a review of the accompanying drawings.

DETAILED DESCRIPTION OF A PREFERRED EMBODIMENT

The invention will now be described in terms of a carbon/carbon composite. However, the invention is applicable to any carbon composite which comprises a carbonized matrix and second material or materials. A method of forming a carbonaceous material suitable for use in thermal applications, such as friction components, employs resistance heating of a mixture of an optional carbon reinforcement material, such as carbon fibers, and a matrix material, such as powdered pitch. Optionally, the mixture may also include any one of various types of additives (the additives may also be referred to as a "filler" or performance enhancer) or the additive may be added to the carbonaceous material after forming the mixture. The resistance heating step is accompanied by application of mechanical pressure to densify the mixture. After hot-pressing, the compressed composite or "preform" is preferably subjected to one or more infiltration steps employing a carbonizable resin or pitch to increase the density of the composite material. The densified preform is then heat-treated to a final temperature of up to about 3200° C. to remove remaining non-carbon components, such as hydrogen and heteroatoms (e.g., nitrogen, sulfur, and oxygen), and form a carbon/carbon composite material, which is almost exclusively carbon. Heat treat may also be performed between densification cycles.

Figure 1:
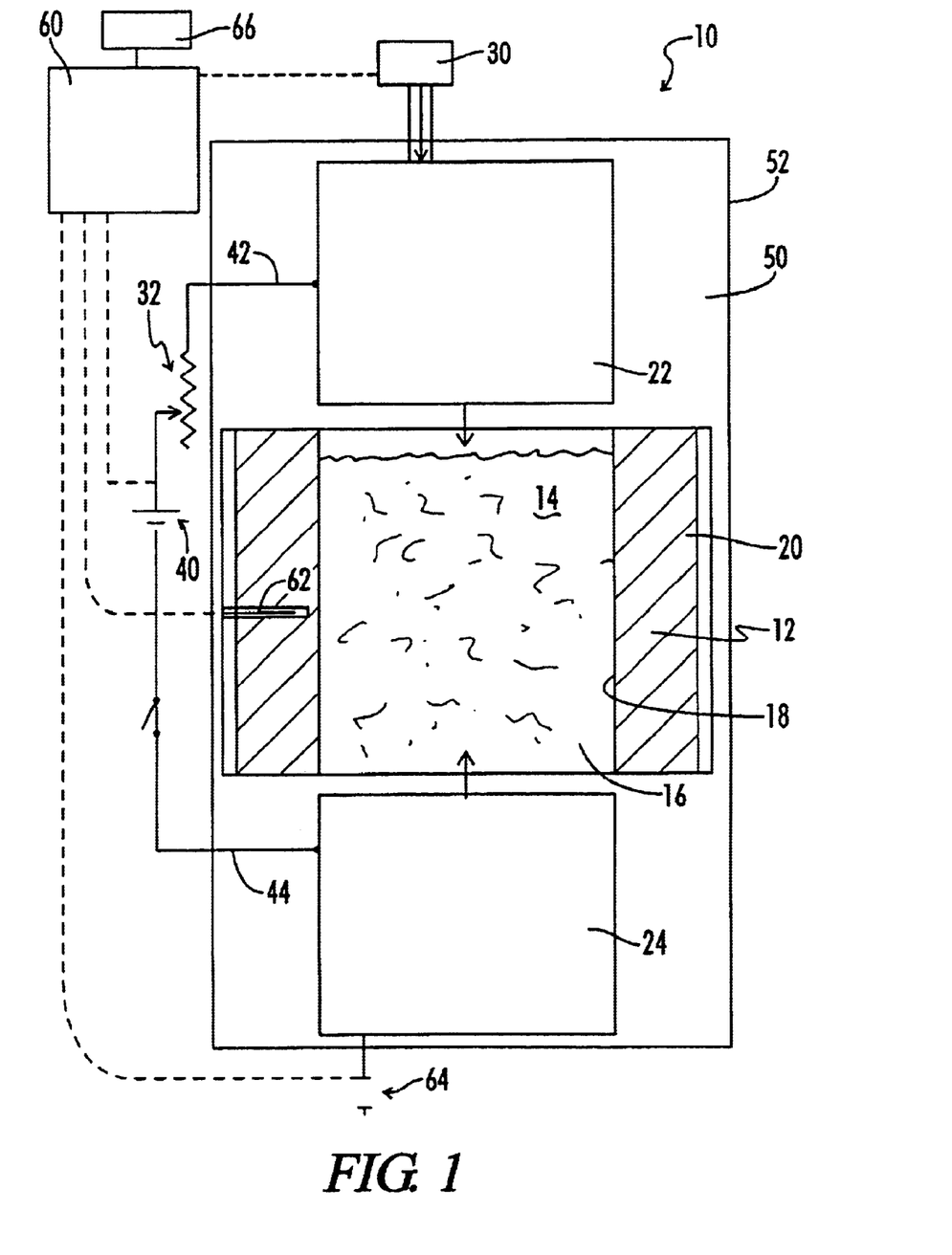
FIG. 1 is a side sectional view of a hot press according to the present invention.

An exemplary hot press 10 suited to resistively heating and compressing the mixture is shown in FIG. 1. The hot press includes a mold box 12, which defines a rectangular cavity 14, shaped to receive the mixture 16 of fibers, optional additive and matrix material. The cavity is surrounded on four sides 18 by a block or panels 20 of an insulation material, such as a refractory material, which is both electrically and thermally insulative. Pressure is applied to the mixture by upper and lower pistons 22, 24, which are pushed toward each other by application of a compressive force to one or both of the pistons. It will be appreciated that the compressive force may alternatively or additionally be applied from opposed sides 18 of the mixture. Alternatively, pressure may only be applied by one of pistons 22 or 24. In the case that pressure is applied by only one piston, the press may be referred to as a single-action ram. The press illustrated in FIG. 1 may be referred to as a dual action ram for at least the reason that pressure is applied from two pistons 22, 24.

A hydraulic system 30, or other suitable system for applying pressure to the piston(s) 22, 24 urges the pistons together. A resistive heating system 32 applies a current to the mixture. The resistive heating system includes first and second electrodes, which are in electrical contact with the mixture. In a preferred embodiment, the pistons 22, 24 also serve as electrically conductive members, i.e., as the first and second electrodes, respectively, and are formed from an electrically conductive material, such as steel. In an alternative embodiment, the electrodes are separate elements, which may apply the current from the same direction as the pistons 22, 24, or from a different direction (e.g., through the sides 18 of the hot press).

The resistive heating system 32 includes a source of electrical power for providing a high current at low voltage, such as an AC supply 40. High DC currents are also contemplated. The AC or DC supply is electrically connected with the electrodes 22, 24 by suitable electrical wiring 42, 44. The mixture of optional additive, matrix material, and fibers 16 is sufficiently conductive to allow current to flow through the mixture and complete an electrical circuit with the first electrode 22 and second electrode 24 and power source 40, while having sufficient electrical resistance to generate heat within the mixture 16 as the current flows between the electrodes 22, 24. The heating rate is preferably at least 100° C./min and can be as high as about 1000° C./min, or higher. The resistance heating rapidly heats the entire mixture 16 to a suitable temperature for removal of volatile materials and carbonization of the matrix, typically in a matter of a few seconds or minutes, creating voids or bubbles within the mixture. Mechanical pressure is applied to densify the mixture 16 as the applied heat drives off the volatile materials.

The hot press 10 is preferably contained within a chamber 50 of a thermally insulative housing 52. An exhaust system (not shown) optionally removes volatile gases from the chamber 50.

The construction of the hot press 10 is such that all parts of the mixture 16 within the cavity 14 are subjected to a uniform pressure and to a uniform current flow. This results in the product having substantially uniform characteristics throughout the mass and which is substantially free of fissures and other irregularities, which tend to result in fracture during use.

A control system 60 monitors the current applied to the mixture 16 and other parameters of the system. For example, the temperature of the mixture 16 is measured with a thermocouple 62, or other temperature monitoring device, mounted through the block 20 of the hot press or in a passage in thermal contact therewith. Displacement of the pistons 22, 24 relative to each other is detected with a displacement detector 64 from which estimates of the mixture density can be made. The control system 60 receives signals from the thermocouple 62 and displacement detector 64, corresponding to the temperature and linear displacement, respectively, and measurements of electrical current, voltage across the material from the current source 40, and hydraulic pressure from the hydraulic system 30. A processor 66 associated with the controller 60 compares the detected measurements with a preprogrammed set of desired values and instructs the control system to adjust certain parameters, such as the applied current, voltage, and/or hydraulic pressure, to achieve a product with the desired characteristics in terms of density, composition, and so forth.

Figure 2:
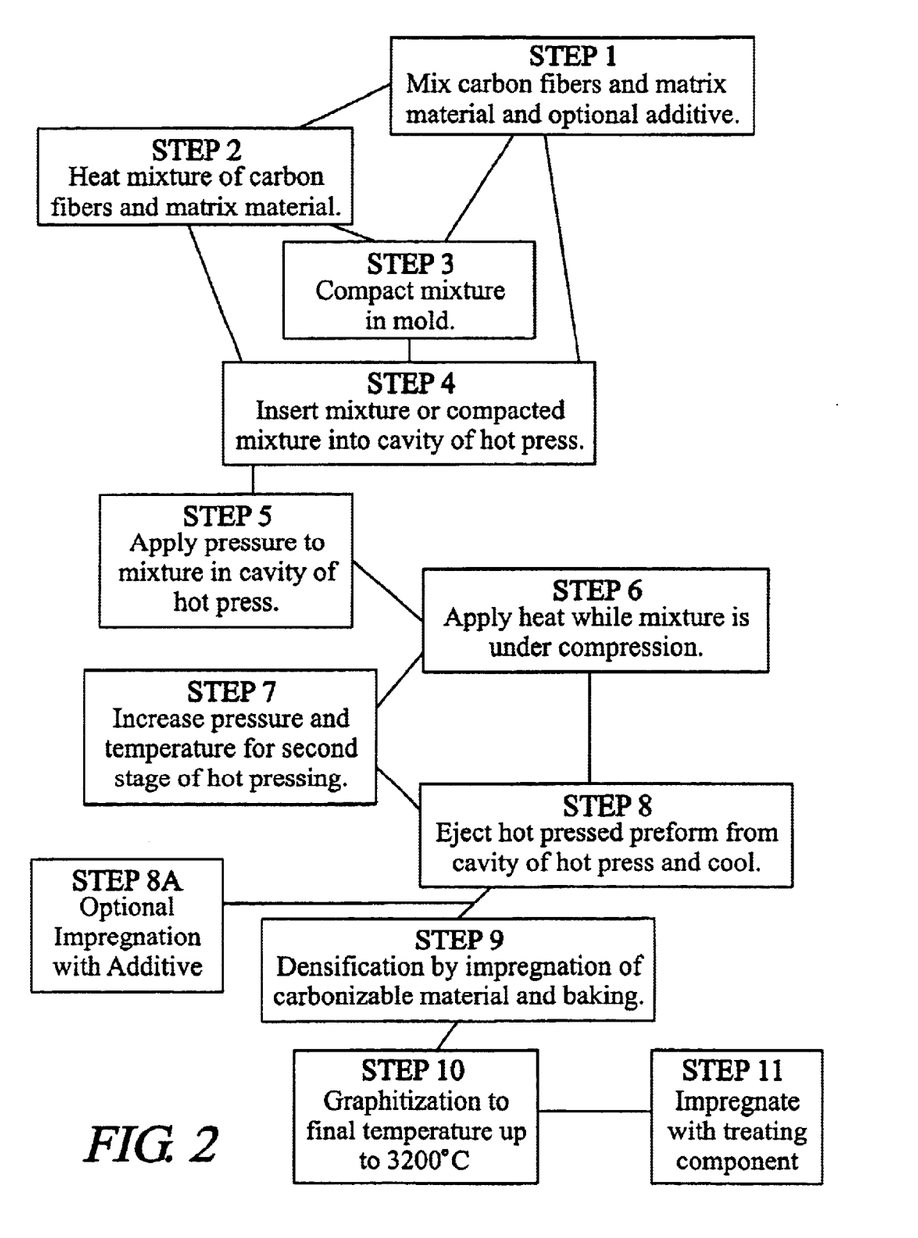
FIG. 2 is a flow chart showing steps of an exemplary process scheme for forming a carbon/carbon composite material having the additive according to the present invention.

With reference to FIG. 2, a flow chart representing the sequence of steps involved in an exemplary embodiment of the manufacture of a carbon/carbon composite material is shown.

In Step 1, a carbon reinforcement material, preferably including carbon fibers, is combined with a carbonizable matrix material and optionally a friction additive. The matrix material acts as a binder and a filler to fill gaps between the fibers. In one certain embodiment, preferably, the mixture 16 includes about 20–80% by weight of fibers and about 20–50% of the matrix material, more preferably, less than about 40% of the matrix material, and optionally about 0–30% of the friction additive, more preferably about 3–25% of the friction additive, even more preferably 5–20% of the friction additive, by weight. Mixture 16 may optionally also include a performance enhancer in about 0–40% by weight. Furthermore, other carbonizable and carbonaceous additives may be incorporated into the mixture. For example, a carbon material, which is electrically more conductive than the fibers or matrix material, such as powdered graphitized carbon, may be added to the mixture to increase the conductivity of the mixture if the resistance is too high for current to flow during resistive heating.

Suitable carbon fibers for use as the reinforcement material include those formed from pitch, such as mesophase pitch or isotropic pitch, polyacrylonitrile (PAN), rayon, cotton, cellulose, other carbonizable materials, and combinations thereof.

The particular choice of carbon fibers depends on the anticipated end use of the composite material. For example, mesophase pitch carbon fibers provide the material with good thermal conductivity, once graphitized. Composites formed from mesophase pitch carbon fibers thus provide effective heat sinks for electronic components. Isotropic pitch carbon fibers exhibit a low thermal conductivity and provide good thermal insulation. PAN-based carbon fibers exhibit high strength and are thus suited to formation of structural components.

The fibers may be comminuted by a process such as chopping and/or milling. The carbon fibers preferably have an aspect ratio equal to or greater than 20:1, more preferably, greater than 100:1, a length of from about 2–30 mm, and a diameter of about 5–15 microns. Carbon reinforcements may also take the form of continuous filament yarn, chopped yarn, or tape made from continuous filaments and which are referred to as unidirectional arrays of fibers. Yarns may be woven in desired shapes by braiding or by multidirectional weaving. The yarn, cloth and/or tape may be wrapped or wound around a mandrel to form a variety of shapes and reinforcement orientations. For ease of handling, bundles of chopped filaments of about 0.2 cm to about 3 cm in length are preferred. Each bundle may comprise about 200–20,000 fiber filaments, each filament having a diameter of about 5–15 microns. Optionally, the bundles could be of different lengths, with some bundles having relatively longer fibers (e.g., 2–3 cm in length), while other bundles have relatively shorter fibers (e.g., 0.2–1.0 cm in length). As used herein, the term "fibers" is intended to encompass all elongated carbon-containing reinforcement materials having a length which is at least twenty times, more preferably, at least 100 times the fiber diameter.

As for fiber properties, in one embodiment it is preferred that the fiber has at least one or more of the following properties: (1) strength of at least 500 MPa; (2) modulus of at least 40 GPa,; (3) resistivity of no more than 50 $\mu\Omega$-m; and (4) thermal conductivity of at least 8 W/mK.

Exemplary fibers include mesophase pitch carbon fiber, obtained from Mitsubishi Chemical Corp., 520 Madison Ave., New York, or Cytec Industries Inc., 5 Garrett Mountain Plaza, West Patterson, N.J. 07424, and PAN carbon fibers from Zoltek, Companies, Inc., 3101 McKelvey Rd, St Louis, Mo. 63044, or Toray Industries (America), Inc., 600 Third Ave., New York N.Y. 10016.

The matrix material provides an independent source of carbon upon thermal decomposition. The matrix material is fusible (i.e., capable of melting) and contains both volatile and non-volatile components. The matrix material decomposes on heating to form an infusible material which is primarily carbon with the release of volatiles. Matrix materials which may be used to form carbon/carbon composites include liquids and solids which become sufficiently liquid or have low enough viscosity upon melting to coat the fibers. Preferred matrix materials are finely comminuted solids. However the invention is not limited to the use of finely comminuted solids, non-finely comminuted solids may also be used to practice the invention. Exemplary matrix materials include carbonizable thermoplastic resins (such as pitch) furan resins, and phenolic resins. Powdered pitch is a particularly preferred matrix material. Mesophase pitches and isotropic pitches with carbon yields of 60% or higher, more preferably, 70% or higher upon coking are particularly preferred as matrix materials. These pitches are produced from petroleum or coal tar, although it is also contemplated that the pitch matrix material may be synthetically formed. Pitch/sulfur mixtures are also suitable as matrix materials.

While the matrix material is described with particular reference to milled pitch powder, it will be appreciated that other matrix materials are also contemplated. However, for matrix materials with lower carbon content, such as phenolic resins, it has been found that the quantity of volatile components which are released during hot pressing is disadvantageous to forming a product of high density. It has also been found that pitch-based matrix materials yield a product with improved friction properties as compared with those employing phenolic resins.

The pitch or other matrix material is preferably in the form of a powder or other finely divided material having an average particle size of less than about 1000 microns, more preferably, less than 100 microns. The desired particle size can be achieved by milling or other comminution process. Exemplary pitch materials include coal tar pitches, available from Rutgers VFT AG, Reilly Industries, Inc., and Koppers Industries, Inc.

The matrix material and reinforcement material may be "dry mixed," i.e., mixed without addition of solvents and at a temperature at which the matrix material is still a solid. More preferably, heat is applied during the mixing phase to raise the temperature of the matrix material above its softening point, which is about 70–350° C. in the case of pitch (Step 2). Preferably, the mixture is heated to about 30° C. or more above the Mettler softening point of the matrix material to reduce the viscosity of the matrix material. A Sigma-type mixer or similar is preferably used to ensure the fibers and pitch are intimately blended. A blending time of about 10–30 minutes is generally sufficient.

While the process is preferably carried out in the absence of additional liquids, such as water or an organic solvent, it is also contemplated that a small amount of an organic solvent may be mixed with the matrix and reinforcement materials to act as a plasticizer for the matrix material and reduce the mixing temperature. Other methods, which involve forming a slurry with a volatile liquid and drying the slurry to form a preform, may also be used.

Preferably, the friction additive comprises elements or compounds that are carbides or react with available carbon atoms to form carbides. More preferably the additive comprises at least one of carbides, oxides, and combinations thereof. Examples of preferred carbides and oxides include compounds which include at least one of the following elements silicon, boron, titanium, molybdenum, vanadium, chromium, hafnium, zirconium, tungsten, and combinations thereof. Other suitable compounds for a friction additive is an isotropic coke or microcrystalline graphite.

Preferably the friction additive, and optional performance enhancer, is in the form of a particle. Preferably, the particles have an average size of at least about 1 micron, more preferably 3 microns or more, up to about several hundred microns, but less than about 1000 microns. Preferably, the size of the friction additive is measured in accordance with ASTM B 822, titled *Standard Test Method for Particle Size Distribution of Metal Powders and related Compounds by Light Scattering*. With respect to the additive, particle as used herein also includes a powder.

The additives may also include performance enhancers. A performance enhancer is a chemical component of the composite that will improve a certain property of the final article formed from the composite. For example, if the final article is a brake component, the performance enhancer may address properties such as wear or noise. Representative examples of performance enhancers include various varieties of barium sulfate, and disulfides such as, but not limited to, molybdenum disulfide.

With continued reference to FIG. 2, in Step 3, the mixture of carbon fibers, additive, and pitch powder is optionally packed into a separate mold from the mold box 12 of the hot press and pressed into a brick form having a density of about 0.5–1.0 g/cm$^3$ and dimensions only slightly smaller than those of the mold cavity.

In Step 4, the brick of fibers, additive, and pitch is transferred to the cavity 14 of the hot press mold box 12 (FIG. 1). In an alternative embodiment, Step 3, and/or Step 2, is eliminated and the mixture of fibers, additive, and matrix material is transferred directly to the mold box 12 from the mixer. The lower piston/electrode 24 is raised to a position in which it forms a base of the mold cavity 14 prior to introduction of the mixture/brick 16.

In Step 5, pressure is applied to compress the mixture 16. The pressure applied is partly dependent on the desired final density of the composite material. In general, a pressure of at least about 35 kg/cm$^2$ is applied. The applied pressure can be up to about 150 kg/cm$^2$, or higher.

In Step 6, the mixture 16 is resistively heated while continuing to apply pressure to the mixture. It is also contemplated that heating may commence concurrently with, or before the start of application of pressure. Preferably, both heating and application of pressure are carried out concurrently, for at least a part of the process time, to densify the material as the volatile materials are given off.

The temperature of the mixture 16 during resistive heating is preferably sufficient to melt the pitch, and optionally remove at least some of the volatiles from the pitch, and facilitate compression of the fiber matrix mixture as the pitch material is rigidized. It should be appreciated that, since pitch is generally not a homogeneous material, a portion of the pitch matrix material may remain unmelted (for example, quinoline insoluble solids tend not to melt), even at temperatures significantly above the softening point. Additionally, while substantially all the volatiles are removed in this step, it is also contemplated that a portion of the volatiles may remain without unduly affecting the properties of the material.

The mixture preferably reaches a temperature of above the carbonization temperature, which is about 500° C. in the case of pitch matrix material. For example, the mixture is heated to at least about 700° C., more preferably, about 800–900° C., although higher temperatures are also contemplated. The power input applied during resistive heating depends on the resistance of the mix and the desired temperature. For a mixture of pitch and carbon fibers, a power input of up to about 60 kW/kg is applied, preferably in the range of 45–60kW/kg, for at least part of the heating process. For example, a power input of about 45–60 kW/kg is applied for 90 seconds to 2 minutes, which may be preceded by application of pressure alone for about 3 to 5 minutes.

In another embodiment, a two-stage process is used. In a first stage (Step 6), a relatively low power input, preferably in the range of about 30 kW/kg is applied for a period of about 30 seconds. In this stage, the temperature is preferably in the range of about 300° C. to 500° C. The bulk of the volatiles are removed from the mixture in this temperature range. Above a certain temperature, about 500° C. in the case of pitch matrix material, the pitch becomes rigid (carbonizes) and it is more difficult to remove the volatiles from the mixture without disruption of the structure. Accordingly, in the first stage, the temperature is preferably kept below the curing temperature of the matrix material.

In the second stage (Step 7), the temperature is increased to a higher temperature (e.g., above about 700° C., more preferably, 800–900° C.), sufficient to carbonize the matrix material. In this stage, the power input may be from about 45 kW/kg to about 60 kW/kg to bring the temperature up to about 800–900° C. The power is maintained at this level for about 1–2 minutes, or longer. The optimum time depends on the applied power input, resistance, and other factors The first and second stages are preferably also associated with different applied pressures. In the first stage (Step 6), for example, the pressure is lower than in the second stage (Step 7). The lower pressure reduces the opportunity for volatile gases to be trapped in the mixture, causing violent disruption of the mixture as they escape. For example, a pressure of about 35–70 kg/cm$^2$ is employed for the first stage, while an increased pressure of about 100–150 kg/cm is employed for the second stage.

The resistance heating/pressing step (Step 6 and/or Step 7) takes under three hours, preferably, about 30 minutes or less, more preferably, less than about ten minutes, most preferably about 5–8 minutes, which is a much shorter time than the days required in conventional heating/pressing systems. Additionally, the density of the preform formed in this step is preferably at least 1.3 g/cm$^3$, more preferably, at least 1.4 g/cm$^3$, most preferably, about 1.5 to 1.7 g/cm$^3$. This is much higher than the density generally achieved in conventional methods, where the density of the fiber/matrix preform is about 0.6–1.3 g/cm$^3$ without further densification procedures. As a consequence, fewer infiltration cycles (Step 9) are used to achieve a final desired density (generally 1.7–1.9 g/cm$^3$, more preferably 1.75–1.85 g/cm$^3$) with the resistive heating method than with conventional hot pressing methods. This decreases the number of processing steps and reduces the overall processing time even further. For example, where six or more infiltration steps are commonly used in a conventional process, the present process accomplishes a final density of about 1.75–1.85 g/cm$^3$ in only one or two infiltration steps. Whereas the conventional method may take several months from start to finished product, the present resistive heating method reduces the time to a matter of days or weeks.

In step 8, the hot-pressed preform is discharged from the mold cavity 14 and cooled. Preferably, the preform is cooled rapidly to a temperature below which oxidation does not occur at a significant rate. For example, the preform is immersed in water or sprayed with droplets or a mist of water to bring its temperature below about 400–500° C. Alternatively, cooling may be achieved with an inert gas flow. Depending on the particular application of the carbon/carbon composite, it may be preferred that the preform is cooled at a rate to avoid cracking of the preform.

While the preform is readily formed in the shape of a rectangular brick, it is also contemplated that the mold cavity may be configured to produce a preform of a cylindrical or other shape, thereby reducing or eliminating the need for subsequent machining to form a desired component part.

Further densification of the cooled preform takes place in Step 9. In this step, a carbonizable material is impregnated into the preform body by pitch or resin impregnation. After each impregnation step, the body is preferably rebaked in Step 9 to carbonize the carbonizable material. It has been found that a target density of about 1.6–1.8 g/cm$^3$ is readily achieved with only a single impregnation step. A density of 1.7 g/cm$^3$, or more, is readily achieved within two such impregnation steps. In this process, the preform is placed in a vacuum chamber and the chamber evacuated. Molten pitch is introduced to the chamber and penetrates into the evacuated pores in the preform, with the aid of applied pressure.

In step 9, the body is heated slowly in a furnace, for example, at a heating rate of about 10° C./hour to about 20° C./hour to a final temperature of about 800–900° C. The body is preferably held at this temperature for about 2–3 hours and then the power is removed. The body is then cooled to a temperature of about 100° C. or less before being removed from the furnace. The body may be cooled slowly, such as over a period of two to three days depending on the size of the body. Alternatively, a cooling medium such as water may be used to reduce the cooling time by spraying the medium on the body. Each carbonization step thus takes about 5–6 days to complete. Having fewer infiltration and carbonization cycles therefore reduces the overall densification time.

In an alternative densification process, the preform is exposed to an atmosphere of a gaseous hydrocarbon, such methane, ethane, propane, benzene, and the like, or a mixture thereof. The hydrocarbon gas decomposes, or is cracked, for example at a temperature of about 900° C. to about 1,200° C. to form elemental carbon, which is deposited within the carbon/carbon composite as a pyrolytic material. This may be referred to as chemical vapor infiltration ("CVI").

In the case that the friction additive comprises an oxide, an embodiment of the invention may include a heat treating step, preferably after Step 9. Preferably the heat treating comprises heating the compressed composite material to a sufficient temperature for a sufficient period of time to convert at least a portion of the oxide friction additive to carbide. For example, if the oxide comprises $SiO_2$, the heat treating step comprises heating the composite material to a temperature of at least about 1500° C., such as at least about 1700° C. to about 1800° C. for a period of up to about 5 hours, such as about 2 to about 4 hours. Preferably, the heat treatment converts at least of portion of the $SiO_2$ into SiC. However, not all of the oxide is required to be converted into a carbide to practice the invention.

At Step 10, the body is subjected to a heat treatment process. In this step, the body is heated in an inert atmosphere, for example, in an induction furnace, to a temperature of about 1500° C., or higher, more preferably, about 2000° C., most preferably, about 2400° C., to remove all (or substantially all) hydrogen and other heteroatoms and produce a carbon/carbon composite. In heat treating the body, it is preferred that the body is not subjected to a temperature equal to or greater than the decomposition temperature of the friction additive, e.g., about 2600° C. for SiC. Above about 2400° C., the composite is at least partially graphitized. The heat treat temperature is selected according to the end use of the final product and is generally above the highest temperature to which the composite material is to be subjected in use.

During this heat treat process, various physical properties of the composite material, such as its thermal and electrical conductivity, are substantially increased, making the composite material suitable for various high temperature commercial applications. The period of time for this procedure is calculated using conventional calculations based upon heat treat time/temperature kinetics, taking into account furnace thermal load and mass.

The invention further includes an alternative embodiment of incorporating the additive into the carbon/carbon material. As shown in FIG. 2, the invention may include optional step 8A to incorporate the additive into the carbon/carbon composite. The friction additive, as well as the optional performance enhancer, may be impregnated into the compressed composite material. In the case of adding the friction additive by impregnation, suitable forms of the additive include at least colloidal suspensions and solutions.

Preferably the colloidal suspension comprises the additive in a concentration of at least about 20% up to about 75%, more preferably at least about 25% up to about 60% and even more preferably at least about 30% up to about 50%. Preferably the additive is in the form of about a micron or smaller particle, more preferably, a submicron sized particle. The additive may be suspended in any material in which the additive is not soluble and the material can be readily vaporized, e.g., in the case that the additive comprises $SiO_2$, water comprises a suitable material to suspend the additive. The material may be referred to as a liquid carrier. An example of a preferred colloidal solution of the friction additive includes silicon dioxide 30% dispersion in water available from Alfa-Aesar Co. of Ward Hill, Mass.

In an embodiment, the friction additive is impregnated into the compressed composite material under vacuum. For example, the composite material may be placed in a vessel fitted with a vacuum outlet and the pressure inside the vessel is reduced below about 50 mm of mercury, preferably below about 10 mm of mercury. The friction additive contained in a separate vessel is then introduced through a connecting valve and the pressure inside the vessel including the composite is increased to atmospheric pressure or higher. Preferably, the composite material remains completely immersed in the liquid carrier of the friction material or the solution containing the friction additive for at least about 10 minutes at about atmospheric pressure or higher. The impregnated composite may then be removed from the vessel for further processing or Step 8A may optionally be repeated 1 or more times depending on the amount of friction additive desired in the composite. At the end of the friction additive impregnation step, any excess liquid in the vessel may be drained off. Also in the case that a vacuum pump is used to create the negative pressure (vacuum) in the vessel, it may be preferred that the vacuum pump is isolated from the vessel prior to introducing the friction additive.

Optionally, this embodiment of the invention may include the step of substantially removing the material which the additive is suspended in from the composite material. For example, if the material is water, the compressed composite, after impregnation, is dried to remove the water. After the material is substantially removed, the compressed composite containing the additive may be processed in the same manner as described above.

With respect to the timing of the impregnation of the composite body with the friction additive, the impregnation may take place before or after heat treating and it may also take place before or after the aforementioned carbon densification impregnation of the preform.

Though Step 8A has been introduced above as an alternative to including the friction additive in Step 1, if so desired, Step 1 with the friction additive may be practiced along with optional Step 8A.

The invention may also include increasing the density of the carbon/carbon composite by impregnation with a treating component. Preferably treating components include a thermosettable resin, a metal, a metal-alloy, and combinations thereof. Examples of preferred resins include such as but not limited to, phenolic resins, epoxies, urethanes, polyimides, cyanate esters, and furan derived resins. One preferred type of phenolic resin comprises a "resole" which comprises an alkaline catalyzed thermosettable phenol-formaldehyde-type resin including partially condensed phenol alcohols. Preferably, the formation of the resole takes place in the presence of the alkaline catalyst with a formaldehyde to phenol ratio of greater than about 1, where the methylol phenols can condense either through methylene linkages or through methylene ether linkages. A preferred type of epoxy comprises an epoxy novolac. Preferably, the novolac resin is formed in the presence of an acid catalyst with a formaldehyde to phenol ratio of less than about 1. Examples of preferred metals include, at least, aluminum, copper, boron and alloys thereof. The metal may be in the form of a metal containing compound such as, but not limited to, a metal-halide.

In one preferred embodiment of the treating component impregnation, the impregnation may take place under vacuum. Preferably, the impregnation of the thermosettable resin may take place at a temperature of about room temperature or higher. The temperature of a metal impregnation is preferably above a temperature required for the metal to be in a liquid phase. Optionally, the impregnation step includes subjecting the treating component impregnated composite material to a temperature greater than the highest expected use temperature of the composite material.

In the case of the use of the thermosettable resin treating component, preferably, the impregnated resin is cured after the impregnation step. Preferably, the resin impregnated composite is heated to a temperature of about 400° C. or less, more preferably about 30000° C. or less to cure the resin. Suitable curing temperature comprise about 250° C. or less and even as low as about 1500° C. Once the resin is cured, the resin may be referred to herein as a thermoset material.

After curing, the resin provides a non-abrasive character to the composite. This is particularly important if the composite is to be used in friction applications such as for brake pads and rotors or brake pads and brake drums. The resin impregnation of the composite reduces the abrasiveness of the composite and improves the erosion resistance of the composite when applied to a metal surface of a rotor or a brake drum. This is a desirable effect brought about by the resin impregnation.

With respect to the timing of the treating component impregnation, preferably, the impregnation step will take place after the carbon composite material has reached a density of at least about 1.30 g/cm³. Examples of preferred densities for the treat component impregnating the composite comprise, at least about 1.45 g/cm³, at least about 1.55 g/cm³, and at least about 1.60 g/cm³. The treating component impregnation may take place as a final processing step prior to machining the composite, for example after heat treatment (Step 10 of FIG. 2). However, the invention is not limited to practicing the treating impregnation as a final processing step.

Advantages of impregnating the composite with the treating component include an increase in the density and strength of the composites and a reduction in porosity. In addition to the advantages of increasing strength and reduced porosity, the invention may also be practiced to protect the composite from excess wear and reduce the abrasion in friction applications of the composite. A further advantage of the treating component impregnated carbon/carbon composite is that it may be used as a braking material, e.g., brake pad, to contact a metal surface of a brake rotor or brake drum of a vehicle. Examples of a suitable metal surface include cast iron, aluminum, or stainless steel. Preferably, the brake rotor or brake drum is part of the hub assembly of a wheel of a vehicle.

Once the general shape of the carbon composite article is fabricated, the piece can be readily machined to precise tolerances, on the order of about 0.1 mm or less. Further, because of the strength and machinability of carbon composites, in addition to the shaping possible in the initial fabrication process, carbon composites can be formed into a variety of shapes.

The resulting carbon composite material is suited to a wide range of applications, including use as brake components, antiskid components, and structural components, such as body panels, pistons, cylinders, for vehicles, such as aircraft, high performance cars, trains, and aerospace vehicles, missile components, and for use as susceptors in furnaces. The reduction in processing time achieved with the resistance heating method opens up many other applications for the material which have hitherto been impractical because of time and production cost constraints.

Typical properties of a carbon/carbon composite formed from mesophase pitch carbon fibers and milled pitch are as follows:

As-pressed density of the preform: 1.55–1.65 g/cm³;

Final density after graphitization: 1.75–1.82 g/cm³ (with two pitch impregnation/carbonization cycles)

Flexural strength: about 50 MPa

Young's modulus: about 35 GPa

Compressive strength: about 60 MPa

Thermal conductivity: about 75 W/m·K.

The electrical conductivity of the graphitized material is generally in the range of about 9–10 $\mu\Omega$-m. With the exception of thermal conductivity, these properties were measured perpendicular to the fiber orientation (perpendicular to the pressing direction). Thermal conductivity was measured in the fiber orientation direction.

Without intending to limit the scope of the invention, the following examples demonstrate the improvements in processing times and other advantages that can be achieved by practicing the invention.

EXAMPLES

Example 1

Carbon/Carbon Composite Made by Dry Mixing of Precursor Materials

Mesophase pitch-based carbon fibers and a matrix material of milled pitch with 170° C. Mettler softening point ("SP") (ASTM D 3104) and 70% coking yield were dry mixed at ambient temperature in a Sigma-type blender or similar type of mixer for about 5–15 minutes. The ratio of fibers to pitch matrix material was from 50–80 wt % fiber: 20–50 wt % pitch. The mixture was collected and charged into a mold box cavity (dimensions approximately 23×20 cm) of a hot press, as illustrated in FIG. 1. A pressure of up to about 140 kg/cm² was applied to the mixture in the press. After pressing to compact the mixture, an electric current of about 1000–2000 amps (a power input of about 30–60 kW/kg) was passed through the mixture. The mix was held under the temperature and pressure conditions for about 5–10 minutes. The temperature of the mixture reached 800–900° C. This hot pressing process carbonizes and densifies the fiber/matrix mixture in a very short period of time, compared with conventional processes. The as-pressed material (preform) had a carbonized density of about 1.6 g/cm³. The preform underwent two pitch impregnation cycles, each one followed by re-carbonization, to densify the material. Lastly, the preform underwent graphitization to a temperature of about 3200° C. to obtain a product having a density of about 1.75 g/cm³.

Example 2

Carbon/Carbon Composite Made by Hot Mixing of Precursor Materials

Various batches of mesophase pitch-based carbon fibers and a matrix material of milled pitch from Example 1 were hot mixed at a temperature of about 200° C. in a Sigma-type blender or similar type of mixer for about 30–45 minutes. The ratio of fibers to pitch matrix material was varied from about 50–80 wt % fiber: 20–50 wt % pitch. During the hot mixing, the matrix material coated the fibers uniformly. The mixture was collected and charged into a mold box cavity of a hot press, and heated and pressed as described for Example 1. Alternatively,.the mixture was compacted in a separate mold to a density of between about 0.5 and 1.0 g/cm³ prior to hot pressing.

A pressure of up to 140 kg/cm² was applied to the mixture in the hot press. After pressing to compact the mixture, an electric current as high as 1500–2000 A (a power input of about 45-60 kW/kg) was passed through the mixture. The mix was held under the temperature and pressure conditions for about 5-10 minutes. The temperature of the mixture reached 800–900° C. This hot pressing process carbonizes and densifies the fiber/matrix mixture in a very short period of time, compared with conventional processes. The as-pressed material (preform) had a carbonized density of between about 1.4 and 1.65 g/cm³. The preform underwent two pitch impregnation cycles, each one followed by re-carbonization, to densify the material. Lastly, the preform underwent graphitization to a temperature of up to about 3200° C. to obtain a product having a density of about 1.70 to 1.75 g/cm³.

TABLE 1 shows the as-pressed densities obtained for various fiber and pitch compositions (i.e., prior to infiltration and graphitization).

TABLE 1

| Carbon Fiber (wt %) | Pitch Binder (wt %) | As-pressed density (g/cc) |
| --- | --- | --- |
| 75 | 25 | 1.61 |
| 65 | 35 | 1.56 |
| 55 | 45 | 1.37 |
| 45 | 55 | * |

*The block cracked after hot pressing.

As can be seen from TABLE 1, the as-pressed density decreased as the pitch binder concentration was increased. Thus for applications where high as-pressed density is desired, it is preferable to keep the pitch binder concentration below about 40–45%.

Samples of the as-pressed composites having an as-pressed density of about 1.55–1.65 g/cm³ were subjected to two impregnation/carbonization cycles. In each impregnation step, petroleum pitch was impregnated into the composite. The samples to be infiltrated were first heated to a temperature of about 250° C. for 6–8 hours and then placed in a pressure vessel, which had been preheated to at least 200° C. A vacuum was pulled for 4–6 hours and then the vacuum pump was isolated and liquid pitch was introduced to the pressure vessel. Nitrogen was introduced into the vessel at a pressure of 100 psig and the samples were impregnated with the liquid pitch for 10–12 hours. The pressure was then released from the vessel and the impregnated composite samples retrieved after the excess liquid pitch was removed.

The impregnated composite was then carbonized by heating it in a furnace to a temperature of about 800–900° C., using a heating rate of 10° C./hour. The temperature was held for about 2–3 hours. The power was removed and the composite allowed to cool from about 900° C. to about 100° C. over a period of two to three days. The impregnation and carbonization steps were then repeated. The carbonized composite was then graphitized in an induction furnace by heating the material to a temperature of 3000° C. at a heating rate of 300° C./hour. The final temperature of 3000° C. was maintained for approximately one hour. Tests on the graphitized composite material produced the following results:

Final density after graphitization: 1.75–1.82 g/cm³
Flexural strength: about 50 MPa
Young's modulus: about 35 GPa
Compressive strength: about 60 MPa
Thermal conductivity: about 75 W/m·K.
Electrical conductivity: about 9–10 μΩ-m.

Example 3

Silicon Carbide Carbon/Carbon Composite Made by Hot Mixing of Precursor Materials Direct Addition of Solid SiC.

Blends of silicon carbide powder with an average particle size of about 10–20 microns from Alfa Aesar Company were blended with mixtures of chopped mesophase pitch carbon fiber and a 170° C. SP coal tar pitch by stirring at about 220° C. The mesophase pitch carbon fibers were about ¼-inch long obtained from Mitsubishi Chemical Corp. The following blend compositions were prepared, as shown in TABLE 3–1:

TABLE 3-1

|  | 1 | 2 | 3 | 4 |
| --- | --- | --- | --- | --- |
| Carbon fiber | 77% | 69% | 69% | 62.5% |
| Matrix | 19.2% | 27.6% | 17.2% | 25% |
| SiC | 3.8% | 3.4% | 13.8% | 12.5% |

The blends were hot pressed to produce carbonized 3 cm thick carbonized composites with dimensions of 23 cm×23 cm. The densities measured for the as-pressed composites were: (1)=1.52, (2)=1.53, (3)=1.55, and (4)=1.55 g/cc. The composites were impregnated with petroleum pitch and then rebaked to 900° C. and the impregnation and rebake steps were repeated . After the 2 impregnation/rebake cycles, the composites were graphitized by heating to about 2500° C. Final densities for the composites were: 1.72 g/cc for (1) and (2) and 1.75 g/cc for (3) and (4). The final composites contained about 4 and 16% of silicon carbide respectively distributed uniformly throughout the composite.

Additional composites were produced as in Example 3 using a blend of 10 parts of SiC powder to 25 parts of the 170° C. SP pitch to 65 parts of chopped mesophase pitch carbon fibers. One composite artifact was subjected to 1 petroleum pitch impregnation ("1 PI") followed by rebake and graphitization while a second composite was subjected to 2 pitch impregnation/rebake cycles ("2PI") followed by graphitization. The final density for the 1 PI composite was 1.67 g/cc and 1.73 g/cc for the 2 PI material.

Friction Testing of the SiC/C/C Composite

Figure 3:
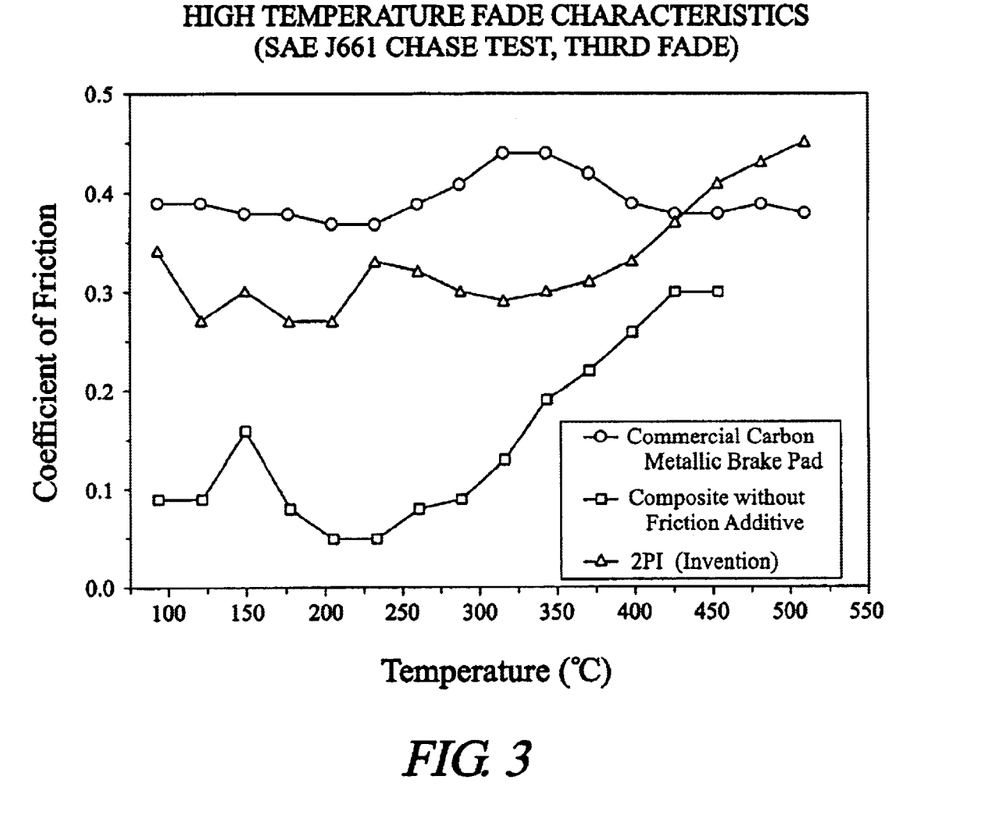
FIG. 3 is a chart of the fade test characteristics of a composite with the friction additive, the same composite without the friction additive and a commercially available product.

Both composites were subjected to friction testing using the Chase Test. The Chase Dry Friction Machine is described in the web site of Greening Testing Laboratories Company of Detroit, Mich. where the test was carried out. As shown in FIG. 3, the test results for the Silicon Carbide Carbon/Carbon Composites ("SiC/C/C") of 2 PI is compared to a Carbon/Carbon ("C/C") composite produced by the same process but without the addition of silicon carbide (see example 6). Without the SiC the coefficient of friction is low at low temperatures, ~0.1 at 100° C., or less, and remains lower than the composite with the friction additive throughout the test, although the friction performance of the composite without the friction additive does improve with increasing temperature. For the SiC/C/C composites, the coefficient of friction remains high at about 0.3 at low temperatures and rises to above 0.4 at high temperatures. The friction behavior is close to that shown for a commercial carbon/metallic brake material used in racing cars.

Example 4

Silicon Carbide Carbon/Carbon Composite Made by Hot Mixing of Precursor Materials Addition of Silicon Dioxide Followed by Thermal Conversion to SiC A hot-pressed composite was produced by adding about 10 parts of $SiO_2$ powder (~2 microns from Alfa Aesar Co.) to 25 parts of the pitch binder 175 SP and 65 parts of fibers. The composite was then impregnated once with petroleum pitch and rebaked to ~900° C. The density after rebake was 1.65 g/cc. The impregnated composite was then heat treated up to ~1750° C. and held at that temperature for about 5 hours to effect conversion of the $SiO_2$ to SiC by reaction with the carbon in the composite. The composite was then taken to ~2500° C. and held at that temperature to effect graphitization. The final density of the composite was 1.46 g/cc. The reduced density is due to the loss of carbon from conversion of the $SiO_2$ to SiC. Microscopy examination of the composite showed that essentially all the $SiO_2$ had converted to SiC leaving ~7% SiC in the composite.

Example 5

Silicon Carbide Carbon/Carbon Composite Made by Impregnation

Impregnation with Colloidal $SiO_2$ Followed by Thermal Conversion to SiC

Carbon/carbon composites were produced using 33% coal tar pitch binder and 67% mesophase pitch carbon fibers were impregnated with a colloidal suspension of $SiO_2$ particles in water. The as-pressed composites which contained no other additives had a density of ~1.54 g/cc after the 900° C. heat treatment in the pressing step. The $SiO_2$ was obtained from Alfa Aesar Co. as a 30% aqueous suspension of 0.01 micron particles. The impregnations were carried out at 25° C. by subjecting the composites to a vacuum of about 0.4 mm. The pump was isolated and isolation was followed by introduction of the $SiO_2$ dispersion in water and then equalization of the pressure to 760 mm. The composites were then dried in a vacuum oven by heating slowly to remove the water. The final pressure in the oven was about 0.1 mm and the final temperature was about 175° C. The weight pickup of $SiO_2$ was measured as ~4.5%.

One of the composite samples was subjected to a second impregnation with the $SiO_2$ dispersion and after water removal the total $SiO_2$ pickup was measured as ~7.5%. Both composite materials were then heated to 1750° C. and held there for 5 hours to effect conversion to SiC. The composites were then heated to 2500° C. for 1 hour to effect graphitization. The final composite densities were measure as 1.50 g/cc for the singly impregnated composite and about 1.47 g/cc for the twice impregnated composite. Examination by microscopy confirmed the conversion of the $SiO_2$ to SiC had occurred.

Example 6

Impregnation of As-Pressed Composite with Phenolic Resin

An as-pressed carbon/carbon composite block prepared using a mixture of 85% carbon fiber and 15% of a 155 SP coal tar pitch binder was impregnated with a diluted phenolic resin. The carbon/carbon composite had reached a final temperature of ~900° C. during the pressing. The density of the untreated composite was measured as 1.52 g/cc.

The resin impregnant was prepared by dissolving a resole phenolic resin in a furfuraldehyde solvent at a 1:1 weight ratio. The dilution reduced the viscosity of the resin from an original value of ~500cp to greater than about 100 cp at room temperature.

The impregnation was carried out by subjecting the composite to a vacuum of ~0.4 mm followed by introduction of the resin/furfuraldehyde blend and equalization of the pressure to about 760 mm. The resin was cured by heating the impregnated composite to 250° C. in a vacuum oven. After curing the composite had picked up 6.5 by weight and the composite density had increased to 1.62 g/cc.

The composite was then heat treated to 900° C. to convert the phenolic resin to carbon. The final density achieved was 1.58 g/cc representing a 0.06 increase over the originally formed material.

Friction Testing of Impregnated C/C Composite.

As stated in Example 3, a carbon/carbon composite produced using 75% of carbon fibers and 25% of 170SP coal tar pitch was impregnated 2 times with pitch and then graphitized. The composite with a density of about 1.70 g/cc was friction tested using the Chase Test. The composite exhibited a low coefficient of friction of 0.1 at a low temperature of about less than 100° C. but the coefficient increased with increased temperature to a value of about 0.25 at about 400° C. The test results are represented on FIG. 3 as the composite without the friction additive. The composite did survive through the entire temperature range when tested in friction against a cast iron part. Additionally the composite did not show the fade or loss of friction with increasing temperature that is typical for conventional phenolic resin bonded friction materials.

Example 7

Post Graphite Impregnation with Phenolic Resin

As-pressed composites were prepared with the composition of Example 6. One carbon/carbon composite block was heated to ~3000° C. to effect graphitization. A second composite block was pitch impregnated followed by rebake to 900° C. and graphitization. Both composites were then impregnated with the diluted phenolic resin used in Example 6 and heat treated to 250° C. to cure the resin.

The non-pitch impregnated composite with an initial density of 1.54 g/cc picked up 7.7% of resin after curing while the composite that had been pitch impregnated once, and had a baked density of 1.70 g/cc picked up 5.2% of cured resin by weight. After impregnation and curing, the composite could be readily machined into thin strips with a thickness of about 250 microns. This was not possible for the non-treat component impregnated composite.

In the erosion test of a composite formed in accordance with example 7, the wear rate of the phenolic resin treated composite was measured as about 3.5 wt. % when tested against a cast iron disc for a period of about 90 minutes. In contrast, a carbon/carbon composite produced by the same process but without the phenolic resin treat had very high wear rate of about 13.9% when friction tested against cast iron in a 90 minute time period.

The apparatus used to conduct the erosion test was a Friction Assessment Screening Test (FAST) Machine. A description of the FAST machine and the test may be located at the web cite for Link Testing Laboratories, http://www.linktestlab.com. The actual testing was performed by the Center for Advanced Friction Studies at Southern Illinois University at Carbondale, Ill.

Example 8

Impregnation with Undiluted Phenolic Resin

In order to increase the phenolic resin content of the composite, an impregnation was carried out using the undiluted resole phenolic used in the previous example. A carbon/carbon composite artifact 7.5×10 cm. was prepared using a blend of 75% fibers and 25% of the 170 SP pitch.

After hot pressing the composite was heat treated at a graphitization temperature of ~2600C. The density of the graphitized composite was measured as 1.31 g/cc. The composite was then impregnated with a liquid resole phenolic resin without the use of a diluent. The viscosity of the pure resin was ~100 cp. In spite of the higher viscosity complete impregnation of the composite with a total pickup of ~35 weight % was achieved. Composite specimens impregnated in this way were then cured at temperatures of 208 and 282 degrees C. The final density for the composites cured at 208° C. was measured as about 1.61 g/cc while the density for the 282° C. cured composites was about 1.58 g/cc. This density increase of ~0.30 g/cc was substantially greater than achieved in previous examples.

Example 9

Impregnation with Furan Resin

A graphitized composite as prepared in example 8 was impregnated with a blend of furfuryl alcohol containing 10% of a 50% solution of zinc chloride in water. The graphitized composite with a density of 1.42 g/cc picked up about 16.2% by weight of the impregnant after curing at 280° C. to cure the resin, the density was increased to 1.65 g/cc after impregnation and curing.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of forming a composite material comprising:

combining a first material with a carbonizable matrix material to form a mixture;

heating the mixture to a sufficient temperature to melt at least a portion of the matrix material, the step of heating including:

applying an electric current to the mixture to generate heat within the mixture; and while heating the mixture, applying a pressure of at least 35 kg/cm$^2$ to the mixture to form a compressed composite material increasing the density of the compressed composite by introducing a carbonizable material into voids in the compressed composite and then baking the compressed composite to achieve a density of at least about 1.30 g/cm$^3$; and impregnating the compressed composite, having a density of at least about 1.30 g/cm$^3$, with a treating component.

2. The method of claim 1, wherein said first material comprises a material containing carbon fibers.

3. The method of claim 1 wherein said treating component comprises at least one of a metal, a thermosettable resin, and combinations thereof.

4. The method of claim 3 wherein said metal comprises at least one of aluminum, copper, boron, and combinations thereof.

5. The method according to claim 3 wherein said thermosettable resin comprises phenolic resins, furan derived resins, epoxy resins, polyimides, cyanate esters, and combinations thereof.

6. The method according to claim 5 further comprising curing said thermosettable resin.

7. The method according to claim 1 wherein said compressed composite, having a density of at least about 1.45 g/cm$^3$ further comprises at least one of a friction additive or a performance enhancer.

8. The method according to claim 1 wherein said impregnation comprises subjecting said compressed composite, having a density of at least about 1.45 g/cm$^3$ to vacuum.

9. The method according to claim 1 wherein said treating component comprises a thermosettable resin.

10. The method according to claim 1 further comprising heating treating said compressed composite, having a density of at least about 1.45 g/cm$^3$, to a temperature greater than the highest use temperature of said composite material.

* * * * *